US012496544B2

(12) United States Patent
Missotten et al.

(10) Patent No.: US 12,496,544 B2
(45) Date of Patent: Dec. 16, 2025

(54) MACHINE MONITORING

(71) Applicant: CNH Industrial Belgium N.V., Zedelgem (BE)

(72) Inventors: Bart M.A. Missotten, Herent (BE); Dré W.J. Jongmans, Klundert (NL); Lode A. Demonie, Staden (BE); Marcel Verhoeven, Zedelgem (BE)

(73) Assignee: CNH Industrial Belgium N.V. (BE)

( * ) Notice: Subject to any disclaimer, the term of this patent is extended or adjusted under 35 U.S.C. 154(b) by 169 days.

(21) Appl. No.: 18/368,164

(22) Filed: Sep. 14, 2023

(65) Prior Publication Data

US 2024/0091693 A1 Mar. 21, 2024

(30) Foreign Application Priority Data

Sep. 15, 2022 (EP) ..................................... 22195955

(51) Int. Cl.
*B01D 46/00* (2022.01)
*A01B 76/00* (2006.01)

(52) U.S. Cl.
CPC .......... *B01D 46/0093* (2013.01); *A01B 76/00* (2013.01); *B01D 46/0086* (2013.01); *B01D 2221/06* (2013.01)

(58) Field of Classification Search
None
See application file for complete search history.

(56) References Cited

U.S. PATENT DOCUMENTS

| 6,128,561 | A | 10/2000 | Janata |
| 10,101,314 | B2 | 10/2018 | Endou |
| 10,627,822 | B2 | 4/2020 | Lee et al. |
| 11,181,435 | B2 | 11/2021 | Jourdan |
| 2007/0012181 | A1* | 1/2007 | Niezgoda ........... B01D 46/0086 95/1 |
| 2016/0345491 | A1* | 12/2016 | Missotten .............. B60K 35/22 |
| 2017/0096931 | A1* | 4/2017 | Beichner ................. F01P 5/043 |
| 2019/0168711 | A1* | 6/2019 | Oesterling ............. G06F 16/51 |
| 2020/0333782 | A1 | 10/2020 | Kent et al. |
| 2021/0192871 | A1* | 6/2021 | Ventimiglia ........... H04L 67/12 |

(Continued)

FOREIGN PATENT DOCUMENTS

| CN | 104464168 A | * | 3/2015 | ............. A01D 46/08 |
| CN | 105339614 A | * | 2/2016 | ......... A01D 41/1274 |

(Continued)

OTHER PUBLICATIONS

English translation of CN104464168 (Year: 2025).*
(Continued)

*Primary Examiner* — Amelia Vorce
(74) *Attorney, Agent, or Firm* — Buchanan Ingersoll & Rooney PC

(57) ABSTRACT

A mobile agricultural machine includes a sensor capable of sensing a gaseous composition of an air flow impinging the sensor; an air filtering unit configured to remove particulate matter from the air flow; and a controller. The controller is configured to: receive a sensing signal from the sensor, wherein the sensing signal is representative of the gaseous composition; and output an indication signal if the gaseous composition is indicative of an anomaly associated with an operation of the mobile agricultural machine.

15 Claims, 6 Drawing Sheets

(56) References Cited

U.S. PATENT DOCUMENTS

| | | | | |
|---|---|---|---|---|
| 2021/0221388 A1* | 7/2021 | Zemek | .................. | G08G 1/127 |
| 2021/0402234 A1* | 12/2021 | Duncan | .................. | A62C 3/07 |
| 2022/0113142 A1* | 4/2022 | Vandike | .................. | G06F 16/29 |

FOREIGN PATENT DOCUMENTS

| | | | | | |
|---|---|---|---|---|---|
| CN | 106227199 | A | | 12/2016 | |
| CN | 106248396 | A | | 12/2016 | |
| CN | 111096145 | A | * | 5/2020 | ........... A01D 45/021 |
| EP | 2472256 | A1 | | 7/2012 | |
| EP | 3447260 | A1 | | 2/2019 | |
| EP | 3644705 | A1 | | 5/2020 | |
| JP | 10234220 | A | | 9/1998 | |
| JP | 2021087369 | A | | 6/2021 | |
| KR | 20180138159 | A | * | 12/2018 | ............... F01N 3/10 |
| KR | 102235212 | B1 | | 4/2021 | |
| WO | WO-2017126146 | A1 | * | 7/2017 | ............. B01D 46/42 |
| WO | WO-2019001885 | A1 | * | 1/2019 | ........... A01D 41/127 |
| WO | 2022084697 | A1 | | 4/2022 | |

OTHER PUBLICATIONS

English translation of CN105339614 (Year: 2025).*
English translation of KR20180138159 (Year: 2025).*
English translation of WO2017126146 (Year: 2025).*
"Advanced Early Fire Detection Solution for Demanding Applications", FireFly AB, FireFly MGD—Ver. 1.3, 2019, 4 pages.
Charumporn et al., "Fire Alarm Systems Using Electronic Nose Systems", IFAC Workshop on Adaptation and Learning in Control and Signal Processing, and IFAC Workshop on Periodic Control Systems, Yokohama, Japan, Aug. 30-Sep. 1, 2004, 5 pages.
Dissertation of Wentian Zhang, "An Efficient Electronic Nose System for Odour Analysis and Assessment", Faculty of Engineering and Information Technology, University of Technology Sydney, Mar. 2020, 184 pages.
European Search Report for European Application No. 22195955.4, dated Feb. 20, 2023, 5 pages.
Zhang, Y., "Diagnosis and Detection Method of Critical Equipment Failure Based on Electronic Nose Technology", Chemical Engineering Transactions, 2018, vol. 68, pp. 241-246.

* cited by examiner

MACHINE MONITORING

CROSS REFERENCE TO RELATED APPLICATION

This application claims priority to European Application No. 22195955.4, filed Sep. 15, 2022, the content of such application being incorporated by reference herein in its entirety.

FIELD OF THE INVENTION

The present disclosure relates to a mobile agricultural machine and a method of monitoring a mobile agricultural machine.

BACKGROUND OF THE INVENTION

Agricultural machinery typically includes one or more driven parts, for example an engine, drive system and/or hydraulic/pneumatic system to move the machinery or parts of the machinery, crop processing apparatus to harvest and/or process crop, and ground engaging tools to process the soil, among others. In some scenarios, the one or more driven parts may lead to hazards or potential damage to the machine. For example, the moving parts can generate heat which can result in a fire hazard. For example, the heat may combust dry fine crop material resulting in damage to the machine and/or injury to the operator. As a further example, a leak in a hydraulic system could lead to irreversible damage of the machine if undetected. In view of the typical high value of agricultural machinery, there is a need to reduce the risk of machine damage and hazards associated with operating agricultural machinery.

SUMMARY OF THE INVENTION

According to a first aspect of the present disclosure there is provided a mobile agricultural machine comprising:
  a sensor capable of sensing a gaseous composition of an air flow impinging the sensor;
  an air filtering unit configured to remove particulate matter from the air flow; and
  a controller configured to:
    receive a sensing signal from the sensor, wherein the sensing signal is representative of the gaseous composition; and
    output an indication signal if the gaseous composition is indicative of an anomaly associated with an operation of the mobile agricultural machine.

The controller may be configured to: compare the sensing signal to a reference odour library; and identify the anomaly if the sensing signal matches an anomaly reference signal of the reference odour library.

The sensor may comprise a sensor array including a plurality of sensor elements. The sensing signal may comprise an element response signal for each sensor element. The controller may be configured to compare a combination of the element response signals to one or more reference signal combinations of the reference odour library.

The sensor may be configured to detect at least one volatile component of the gaseous composition.

The anomaly associated with the operation of the mobile agricultural machine may comprise a malfunctioning of the machine or an anomalous crop processing event within the machine.

The gaseous composition indicative of the anomaly associated with the operation of the mobile agricultural machine may comprise one or more of: a composition associated with ignition, heating, smouldering, smoking or burning of one or more of: crop, crop residue, a machine fluid, dust or dirt; a composition associated with friction or rubbing of components; a composition associated with overheating or burning of electric cables and/or electric or electronic components, for example but not limited to batteries, power electronics, electric generators or motors, computing devices, controllers; a composition associated with leakage or spillage of a machine fluid; and a composition associated with a drive system malfunction.

The sensor may be positioned at a downstream end of an air flow circulating within the mobile agricultural machine.

The sensor may be positioned downstream of an air flow passing over one or more components of the mobile agricultural machine.

The one or more components may comprise one or more of: an engine, a cooler, a gearbox, a belt or a crop processing component.

The sensor may be positioned on an internal side of an outer shielding panel of the mobile agricultural machine.

The mobile agricultural machine may further comprise a second sensor capable of sensing a gaseous composition. The second sensor may be positioned at an air intake of the agricultural machine. The sensor may be positioned downstream of an air flow flowing from the air intake. The controller may be configured to: compare the sensing signal from the sensor with a second sensing signal from the second sensor; and identify the anomaly based on the comparison.

The mobile agricultural machine may further comprise a clean air source positioned at an air intake of the agricultural machine. The clean air source may be configured to provide intermittent clean air flow. The sensor may be positioned downstream of an air flow flowing from the air intake. The controller may be configured to: identify the anomaly based on the sensing signal from the sensor in the presence of the clean air flow from the clean air source.

The mobile agricultural machine may further comprise a sealed housing enclosing the sensor. The air filtering unit may be configured to control an air flow into the sealed housing.

The air filtering unit may comprise a dust filter. The controller may be configured to: detect a saturation of the dust filter; and in response, output a dust filter alert signal and/or initiate a cleaning mechanism for cleaning the dust filter. The dust filter may be positioned facing downwards so that dust can fall off.

The mobile agricultural machine may comprise an air flow sensor configured to sense an air flow or an air pressure at the sensor. The controller may be configured to detect a saturation of the dust filter based on the sensed air flow or air pressure.

The air flow sensor may comprise an air flow sensor element or an air pressure sensor. The air flow sensor may be positioned between the dust filter and the sensor.

The controller may be configured to detect the saturation of the dust filter based on any of:
  an air flow value being less than an acceptable air flow threshold;
  a reduction in air flow value exceeding an acceptable air flow reduction threshold;
  an air pressure being less than an acceptable air pressure threshold; or a reduction in air pressure exceeding an acceptable air pressure reduction threshold.

The air flow sensor may comprise a differential pressure sensor having: an internal air pressure sensor positioned on an internal side of the dust filter between the dust filter and the sensor; and an external air pressure sensor positioned on an external side of the dust filter opposite the internal side.

A processor of the air flow sensor or the controller may be configured to sense the air flow through the dust filter based on a differential pressure between the internal air pressure sensor and the external air pressure sensor.

The controller may be configured to detect the saturation of the dust filter based on any of:
- an air flow value being less than an acceptable air flow threshold;
- a reduction in air flow value exceeding an acceptable air flow reduction threshold;
- a differential pressure being greater than an acceptable differential pressure threshold; or
- an increase in differential pressure exceeding an acceptable differential pressure increase threshold.

The controller may be configured to output the indication signal if a level of the gaseous composition indicative of the anomaly is greater than an anomaly threshold level.

The controller may be configured to set the anomaly threshold level based on a baseline level of the gaseous composition when the mobile agricultural machine is in a stationary work condition.

The controller may be configured to set the anomaly threshold level based on averaging a baseline level of the gaseous composition during a traversal of a field by the mobile agricultural machine.

The controller may be configured to output the indication signal to one or more of:
- a remote monitoring module;
- a user device;
- a cab display screen;
- an audible signal generator; and
- a visual signal generator.

The controller may be configured to output a control signal for controlling the mobile agricultural machine based on the anomaly indicated by the gaseous composition.

The controller may be configured to output a control signal to:
- activate a fire extinguishing system;
- abort an agricultural operation;
- remove or reduce power to one or more components of the mobile agricultural machine; and/or
- increase or decrease a fan speed of a cooling fan.

According to a second aspect of the present disclosure, there is provided a method of monitoring a mobile agricultural machine comprising:
- receiving a sensing signal from a sensor of the mobile agricultural machine wherein the sensing signal is representative of a gaseous composition of a filtered air flow impinging on the sensor; and
- outputting an indication signal if the gaseous composition is indicative of an anomaly associated with an operation of the mobile agricultural machine.

According to a third aspect of the present disclosure there is provided a mobile agricultural machine comprising:
- a sensor configured to detect a gaseous composition of an air flow impinging on the sensor; and
- a controller configured to:
  - receive a sensing signal from the sensor, the sensing signal representative of the gaseous composition;
  - compare the sensing signal to a reference odour library; and
  - output an indication signal if the sensing signal is indicative of an anomaly associated with an operation of the mobile agricultural machine.

There may be provided a computer program, which when run on a computer, causes the computer to configure any apparatus, including a circuit, controller, converter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download. There may be provided one or more non-transitory computer-readable storage media storing computer-executable instructions that, when executed by a computing system, causes the computing system to perform any method disclosed herein.

BRIEF DESCRIPTION OF THE DRAWINGS

One or more embodiments will now be described by way of example only with reference to the accompanying drawings in which.

DETAILED DESCRIPTION OF THE PREFERRED EMBODIMENTS

Figure 1:
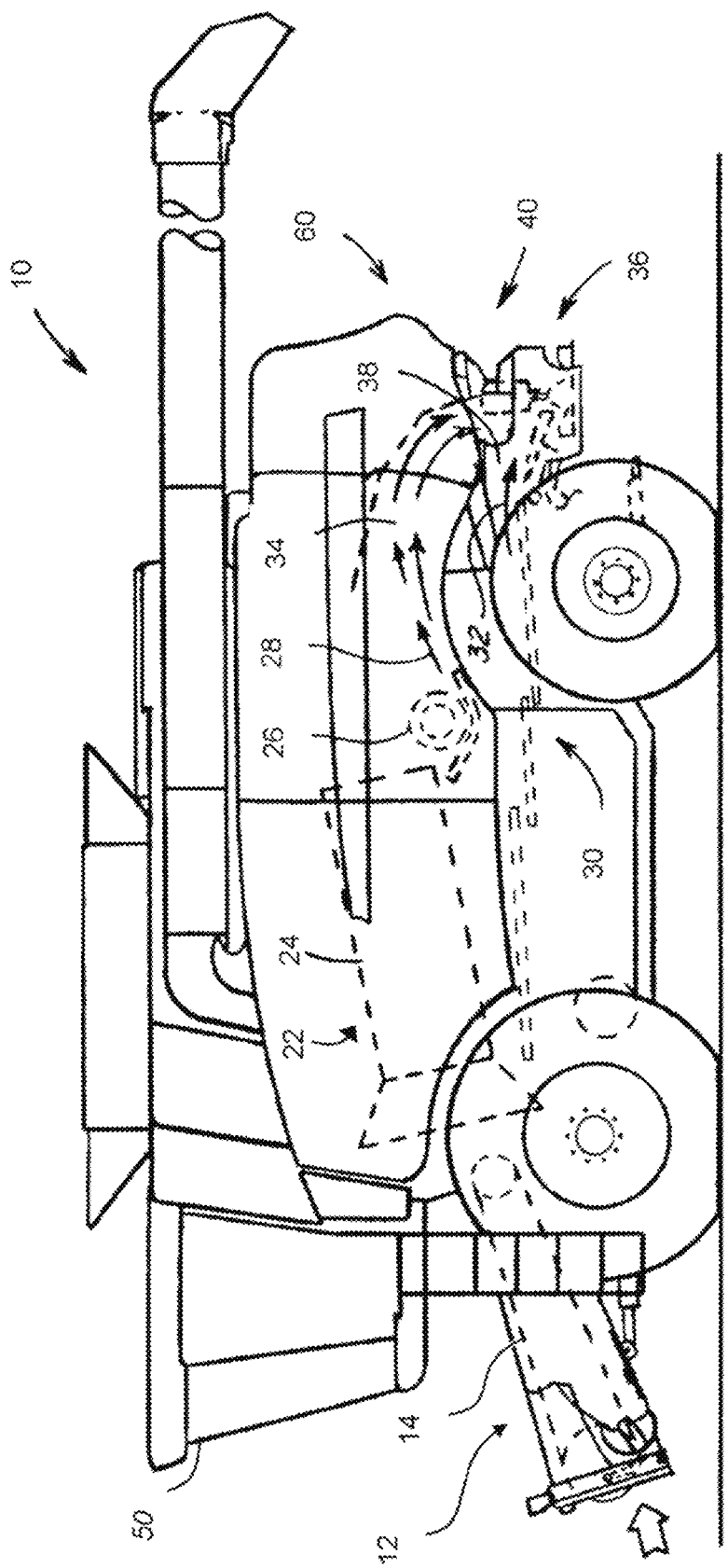
FIG. 1 illustrates an example mobile agricultural machine.

FIG. 1 illustrates an example mobile agricultural machine in the form of a combine harvester 10. The combine harvester 10 comprises a feeder 12 at a front end to carry a header (not shown). The header includes a cylindrical header reel (not shown) that rotates and directs crop material from growing crops being cut onto the header, the header directs the cut crop material towards a feeder 12 that will supply the cut crop material to the other systems of the combine harvester 10, typically by using a conveyor 14 in the feeder 12.

The combine harvester 10 comprises a threshing system 22 arranged behind the feeder 12. The threshing system 22 includes a rotor 24 rotatable for separating straw stalks and other plant residue, generally referred to as straw 28 or straw residue below, from the harvested crop.

The combine harvester 10 also comprises a chopper 26 rotatable for chopping and propelling a flow or stream of straw 28 rearwardly along an airborne trajectory through a rear cavity 34 enclosed by structural sheets of the combine harvester 10.

The combine harvester 10 comprises a cleaning system 30 for receiving the harvested crop from threshing system 22 and removing chaff and any other remaining residue, including seed pods, husks, and the like, generally referred to as chaff 32 or chaff residue, from the grain and directing a flow or stream of chaff 32 rearwardly through a lower region of rear cavity 34, towards a lower opening 38.

A horizontal residue spreader assembly 36 is located in the rear cavity 34. The spreader assembly 36 comprises a crop residue distribution system 40, e.g. including two side-by-side spreader disks or impellers configured for rotation in opposite directions about generally vertical rotational axes. The crop residue distribution system 40 may also include pivotably supported deflector doors located at a rear end 60 of the rear cavity 34. The deflector doors may be pivotable between a closed position and an open position, to control spreading of the straw 28 and chaff 32, collectively referred to as crop residue (also known as "material other than grain" or MOG), behind the combine harvester 10.

As evident from the above description, combine harvesters are complex machine with many moving parts that operate on large volumes of crop and create a dusty environment. As a result, there are multiple potential points of failure and significant fire hazard resulting from heat generated by the moving parts operating on dry fine crop. Other agricultural machines, such as balers, tractors and forage harvesters also have multiple driven parts creating similar risks.

Mobile agricultural machines, such as combine harvesters, often rely on an operator to detect faults or hazards associated with operation of the machine. For example, an operator may suspect a malfunction in the machine when hearing unusual sounds or feeling unusual vibrations. As a further example, an operator may sense an unusual smell associated with faults or hazards, for example, burning crop, a belt rubbing against a chassis of the machine, an electric cable overheating, an electric of electronic component overheating or an oil leakage out of the machine. However, modern agricultural machines, such as the illustrated harvester 10, may have an air-conditioned and silenced operator cab 50. While this can improve operator comfort, the operator may be less aware of hazards or faults because the air-conditioning can mask smells associated with the hazard or fault. An operator may therefore miss these warning smells during operation of the harvester, resulting in serious damage due to continued operation or sometimes total loss of the harvester.

The present disclosure provides a mobile agricultural machine with a sensor for detecting a gaseous composition associated with the machine and a controller for outputting an indication signal if the detected composition is associated with a fault or hazard.

Figure 2:
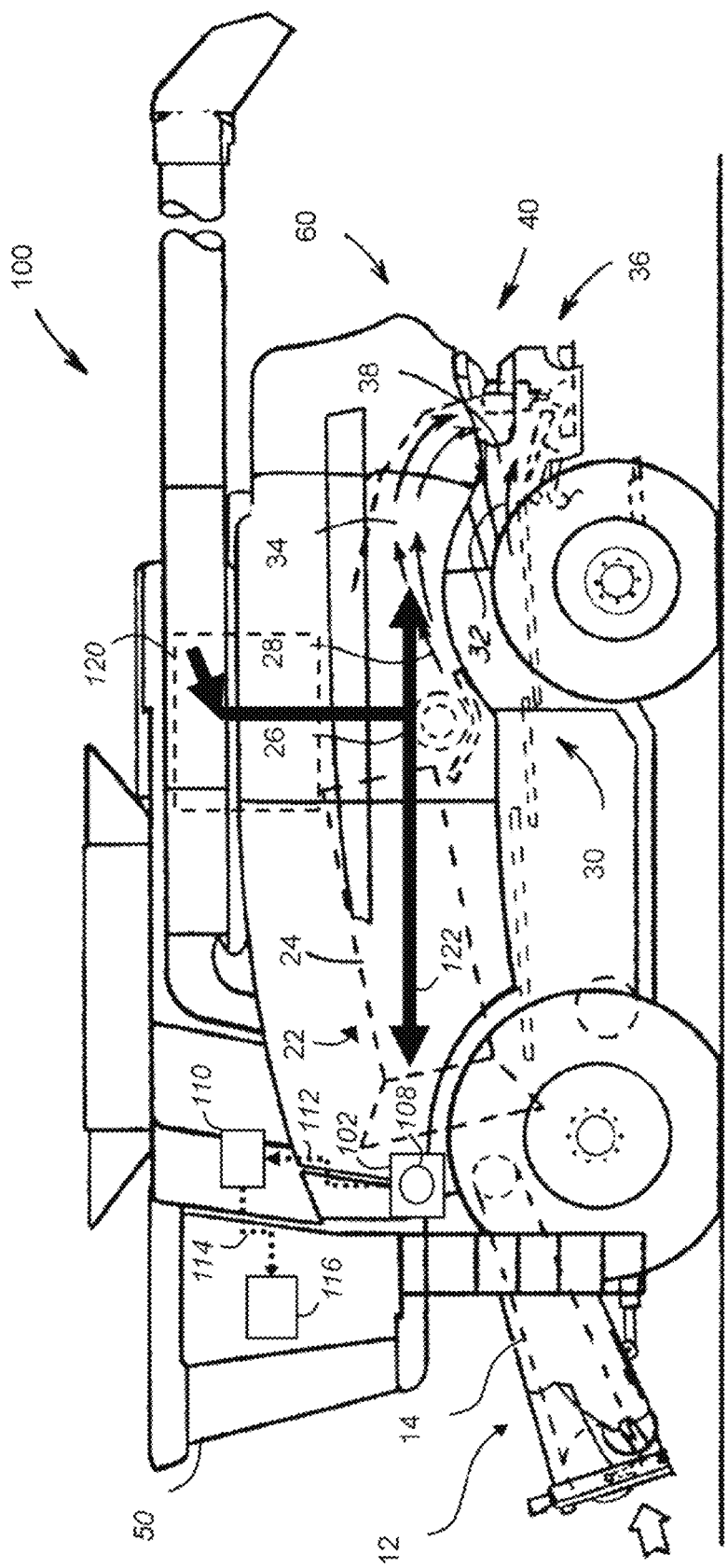
FIG. 2 illustrates a mobile agricultural machine according to an embodiment of the present disclosure.

FIG. 2 illustrates a mobile agricultural machine 100 according to an embodiment of the present disclosure. The mobile agricultural machine 100 (which may be referred to herein as the machine 100) comprises a combine harvester. Features of FIG. 2 that are also present in FIG. 1 have been given the same reference number and will not necessarily be described again here.

The mobile agricultural machine 100 comprises a sensor 108 capable of sensing a gaseous composition of an air flow 122 impinging (or flowing towards) the sensor 108. The machine 100 further comprises an air filtering unit 102 configured to remove particulate matter from the air flow 122. The machine 100 further comprises a controller 110. The controller 110 receives a sensing signal 112 from the sensor 108. The sensing signal 112 is representative of the sensed gaseous composition. The controller 110 outputs an indication signal 114 if the sensed gaseous composition is indicative of an anomaly associated with an operation of the mobile agricultural machine 100. In this example, the controller outputs the indication signal 114 to a cab display 116 in the operator cab 50.

The mobile agricultural machine 100 may rapidly identify faults and/or hazards and advantageously alert an operator to their presence and/or initiate corrective action. For example, the gaseous composition may be indicative of smouldering chaff in a harvester and the indication signal may alert the operator to the fire hazard or activate an extinguisher system. The machine 100 can advantageously provide more rapid detection of fire, than a conventional smoke detector, because the smell of smouldering chaff can be an earlier indicator of crop ignition than smoke or radiated heat. Fire detection in conventional agricultural machinery can also be difficult because a smoke detector (which works on a principle of attenuation of an optical light beam from sender to receiver due to the smoke (or dust)) can suffer false alarms due to the high particulate presence (dust and dirt) in agricultural processes. The sensor 108 of the machine 100 advantageously senses a smell signature rather than the presence of smoke.

As described herein, an anomaly associated with an operation of the mobile agricultural machine 100 may comprise:
 i. a malfunctioning of the machine 100, for example:
    a. a fluid leakage such as oil, fuel or coolant;
    b. friction or rubbing of components such as rubber belts rubbing against metal, e.g., the chassis; or
    c. a drive system malfunction such as a cooling system malfunction, depletion of oil, catalytic converter failure etc; or
    d. overheating or burning of electric cables, electric or electronic components, such as batteries, power electronics, electric generators or motors, computing devices, controllers;
 ii. anomalous crop processing or an anomalous crop processing event within the machine 100, for example:
    a. ignition, heating, smouldering, smoking or burning of crop, crop residue, dust or dirt within the machine 100; or
    b. crushing of crop matter in regions of the machine that should be isolated from crop matter.

In other words, the anomaly may comprise: fluid leakage, component friction, component failure, heating or burning of a component, heating or burning of a fluid, heating or burning of crop material, heating or burning of dust or dirt or crushing of crop material. The anomaly may comprise an abnormality in the operation of the machine 100 that may lead to a degradation in functionality of the machine 100.

As described herein, the term heated or heating in relation to a machine component, fluid or crop material may refer to excessively heated or excessive heating such that the component, fluid or crop is at risk of ignition. Excessive heating comprises the situation wherein the heating causes the release of a certain gas, for example the release of a certain gas by the fluid when a certain temperature has been exceeded, indicating a certain risk of ignition for the fluid, or nearby crop and/or components. Excessive heating also comprises the situation wherein the heating first causes the release of a combustible gas, for example by thermal decomposition of crop, creating together with the oxygen in the air a gas mixture which is at risk of ignition by heat or a spark. Excessive heating also comprises the situation wherein an initial stage of ignition or fire, like for example smouldering, has started, for example in a localized hot spot, creating certain combustion gases. In this sense, the heating of, or heated, machine component, fluid or crop material may refer to a temperature exceeding a threshold as may be indicated by a signature gaseous composition or a level of one or more sensed gaseous components of a gaseous composition exceeding a threshold. By heating fluid, crop material or components on a hot plate or in a chamber, monitoring the ignition and sampling the gaseous composition, signature gaseous compositions and/or levels of one or more sensed gaseous components of the gaseous composition can be determined in a laboratory and correlated with temperatures exceeding thresholds and/or risk of ignition and/or initial stage of ignition or fire.

As described herein, a gaseous composition may comprise one or more gaseous components. The gaseous composition may comprise one or more volatile gaseous components. Volatile gaseous components can be gases released at certain temperatures when machine components, fluid or crop are heated, including release of combustible gases, or can be combustion gases created in an initial stage of ignition or fire.

The controller 110 may identify the anomaly by comparing the sensing signal 112 to a reference odour library. For example, the controller 110 may identify the anomaly based on the sensing signal matching one of a list of anomaly reference signals (corresponding to reference odours) of the reference odour library. Here, the term "matching" may refer to matching within an acceptable error threshold. In some examples, the controller 110 may identify a type and/or relative quantity of one or more odours (gaseous compositions) associated with the machine 100 by comparing the sensing signal 112 to the reference odour library. The controller 110 may then identify the anomaly based on the type and/or quantity of the one or more odours.

The reference odour library may comprise a database of reference signals corresponding to sensing signals output by the sensor 108 in response to one or more reference gaseous compositions. The one or more reference gaseous compositions may each comprise a gaseous composition produced during malfunctioning of the machine or anomalous crop processing. For example, each reference gaseous composition may be associated with: a specific fluid, heating or burning of a specific fluid, heating or burning of a specific component material (e.g., rubber), heating, smouldering or burning of a specific crop material, crushing of a specific crop part etc.

The reference odour library may be generated during a calibration process in which the sensor 108, or a substantively identical reference sensor, is exposed to a series of reference samples. The reference samples may comprise samples generated from real components (e.g. specific fluids, rubber friction, heated or burning components, heated or burning fluids, heated, smouldering or burning crops etc) or synthetic samples generated according to a known composition. The resulting sensing signal can then be stored as the reference signal associated with the reference gaseous composition. The controller 110 may generate the reference odour library as part of the calibration process. The controller 110 may store the reference library in a memory of the system 100 or in remote storage accessible via a network (such as the internet).

In some examples, the reference library may further comprise a look-up table indicating a likely position of each anomaly. The likely position may comprise predetermined data based on field use from other agricultural machines. In some examples, the reference odour library may be at least partially generated or updated using operational data from a plurality of agricultural machines and machine learning. For example, an operator may report an anomaly and the controller 110 may associate the fault with a particular gaseous composition. The relationship can then be shared with and/or verified by other agricultural machines and used to update the reference odour library.

The sensor 108 may comprise any sensor capable of detecting one or more gaseous components. The sensor 108 may comprise an odour sensor. The sensor 108 may comprise one or more sub-sensors that can identify and quantify specific chemical species associated with the anomaly, for example specific chemical species associated with a burning crop or specific chemical species associated with a fluid.

In some examples, the sensor 108 may comprise an electronic nose. Electronic noses can advantageously detect a wide range of gaseous compositions. As an example, the sensor 108 may comprise a sensor array including a plurality of sensor elements. The sensor elements may comprise any active element that undergoes a change in one or more chemical or physical properties in the presence of one or more gaseous components. Each sensor element may comprise a non-specific sensor element that can detect the presence of one or more volatile gaseous components but does not identify the specific chemical species. The one or more sensor elements may comprise any known sensor elements such as metal oxide semiconductors (MOS) sensor elements (including complementary MOS (CMOS) sensor elements), metal oxide semiconductor field effect transistors (MOSFET) sensor elements, surface acoustic wave sensor elements, conducting polymer sensor elements, fibre optic sensor elements, micro-electromechanical systems (MEMS) sensor elements, and quartz crystal microbalance sensor elements. The sensor elements may respond to the presence of one or more volatile gaseous components with a change in electrical properties, such as electrical conductivity. Different sensor elements of the sensor array may have different physical properties such that they have different response signatures to the presence of the gaseous components. For example, different MOS or MOSFET sensor elements may have a different physical size, different coatings or different doping. Providing different sensor element responses can improve detection of specific gaseous components by the sensor 108.

Figure 4A:
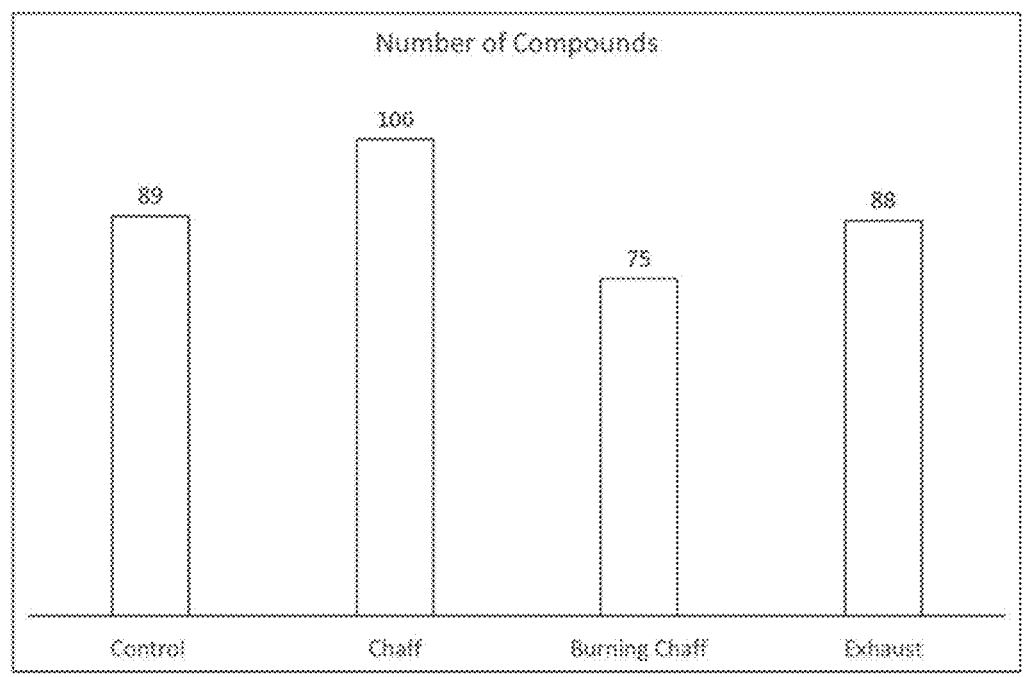
FIG. 4A illustrates the number of chemical compounds measured in gaseous compositions from chaff, smouldering chaff, machine exhaust and a control sample.

Each sensor element may output an element response signal. The combination of element response signals may form the sensing signal 112. The combination of element response signals can provide a distinct odour signature for a particular gaseous composition. For example, many odours will comprise a plurality or mixture of volatile gaseous components. As an example, FIG. 4A illustrates the number of chemical compounds measured in gaseous compositions from chaff, smouldering chaff, machine engine exhaust and a control sample. Each sensor element may respond differently to the different volatile components of the mixture due to manufacturing tolerances, position on the sensor array and/or design differences (such as the different physical properties mentioned above). The plurality of different element response signals from each sensor element can provide a distinct electronic fingerprint for identifying each gaseous mixture. The reference odour library may include reference signal combinations corresponding to the combination of element response signals output by the plurality of sensor elements in the presence of corresponding reference gaseous compositions. During operation in the field, the controller 110 may compare the combination of element response signals to the reference signal combinations to identify any anomalies associated with the operation of the machine 100. For example, the controller may identify a type and/or quantity of one or more gaseous compositions associated with the anomaly and output the indication signal based on the type and/or quantity.

The controller 110 may implement pattern recognition and/or multivariate analysis techniques to generate the reference odour library and/or identify the type and relative quantity of one or more gaseous compositions associated with the anomaly. For example, the controller 110 may train an artificial neural network (ANN) using the (labelled) reference samples during the calibration process. During operation in a field 104, the controller 110 can then identify, classify and/or quantify the one or more gaseous compositions associated with the anomaly using the ANN. The controller 110 may implement other multi-variate analysis techniques such as principal component analysis (PCA).

Figure 4B:
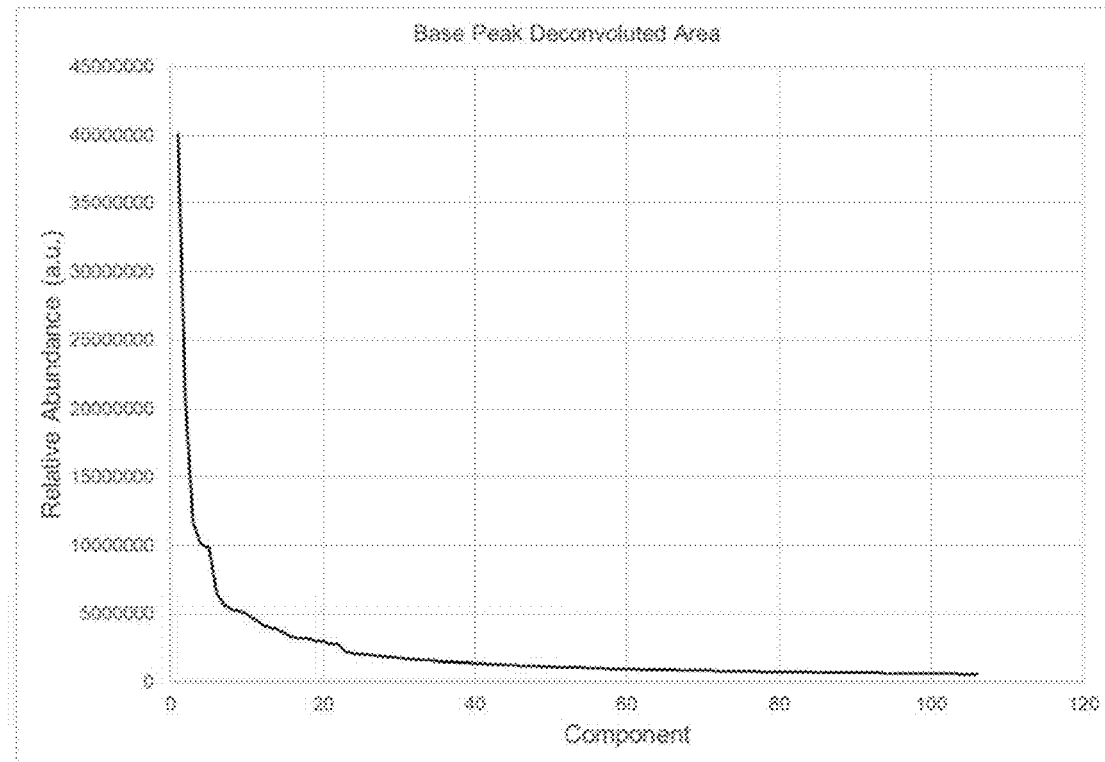
FIG. 4B illustrates the distribution of gaseous components in a gaseous composition from smouldering chaff determined using gas chromatography mass spectrometry.

As an example, FIG. 4B illustrates the distribution of gaseous components in a gaseous composition from smouldering chaff determined using gas chromatography mass spectrometry. The large number of gaseous components and the relative abundance of the first ten or so components can enhance the electronic fingerprinting of the electronic nose.

Figure 5A:
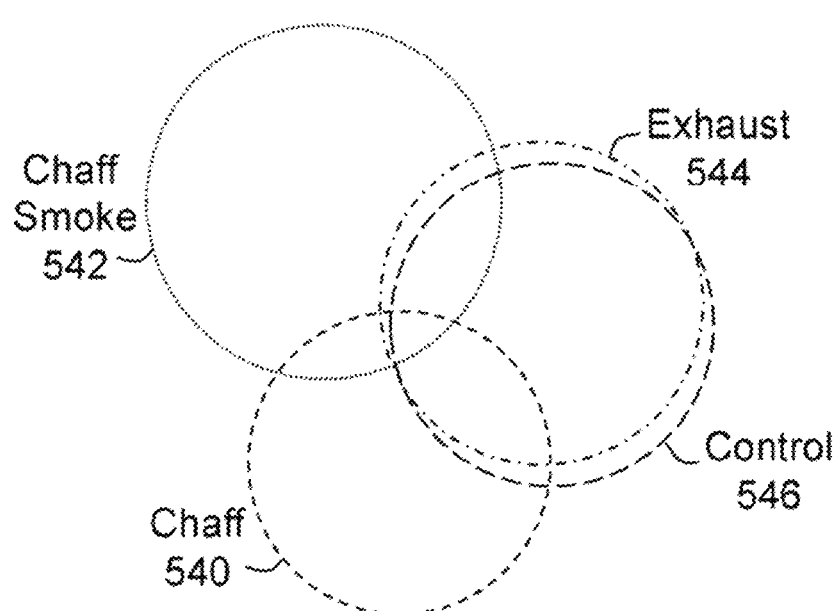
FIG. 5A schematically illustrates an overlap in the gaseous compositions of the chaff, smouldering chaff, machine exhaust and control sample of FIG. 4A.
Figure 5B:
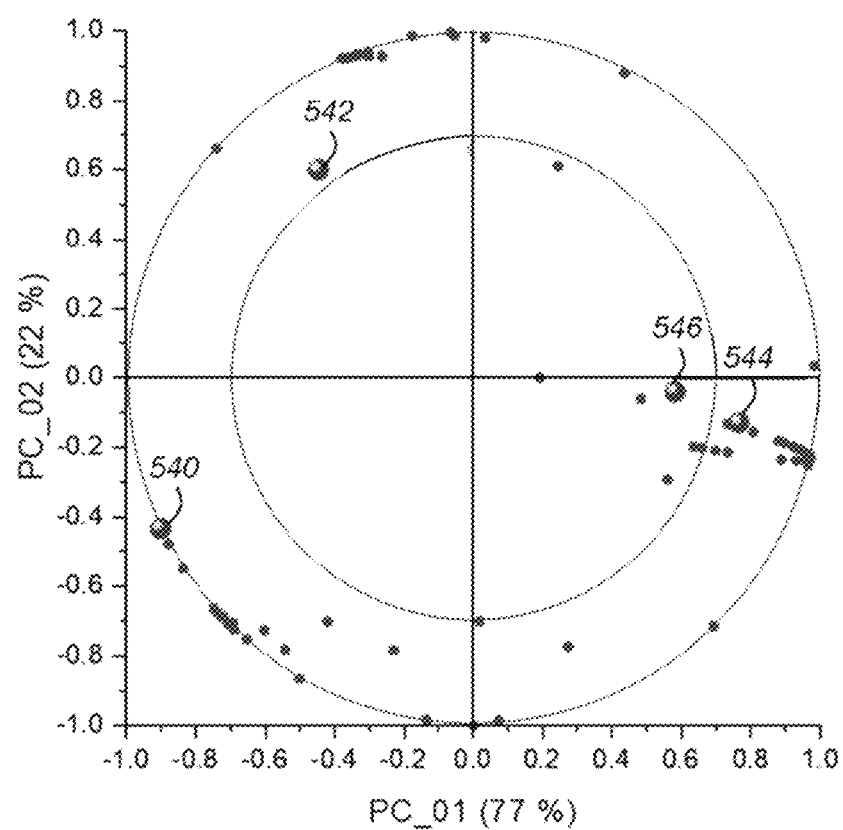
FIG. 5B illustrates data from a principal components analysis demonstrating the discrimination of smouldering chaff from the other gaseous compositions present.

FIG. 5A schematically illustrates an overlap in the gaseous compositions of the chaff 540, smouldering chaff 542, machine exhaust 544 and control sample 546 of FIG. 4A. As illustrated, smouldering chaff comprises a number of distinct components that can discriminate it from (unburnt) chaff and machine exhaust. FIG. 5B illustrates PCA data demonstrating the discrimination of smouldering chaff from the other gaseous compositions present. The data illustrates that through use of a reference library, the controller 110 can implement pattern recognition on the element response signals to sense the gaseous composition associated with smouldering chaff and discriminate the gaseous composition from other gaseous compositions present in the air flow 122.

In some examples, the controller 110 may determine a level of the gaseous composition indicating the anomaly. For example, for a specific sensor, the controller 110 may determine the level based on a magnitude of the sensing signal. For other examples, such as an electronic nose sensor, the controller 110 may determine the level based on the comparison to the reference odour library and/or as an output of the pattern recognition/multivariate analysis. The controller 110 may monitor the sensing signal and the level of the gaseous composition over time and output the indication signal 114 if a level of the gaseous composition indicating the anomaly is greater than an anomaly threshold level.

In some examples, the controller 110 may set the anomaly threshold level based on a baseline level of the gaseous composition indicative of the anomaly (as sensed by the sensor 108) when the machine 100 is in a stationary work condition. In other examples, the controller 110 may set the anomaly threshold level based on a baseline level of the gaseous composition averaged during a back and forth traversal of a field by the mobile agricultural machine 100. Back and forth traversal of the field can advantageously compensate any wind effects on the air flow 122 through the machine 100.

Figure 3A:
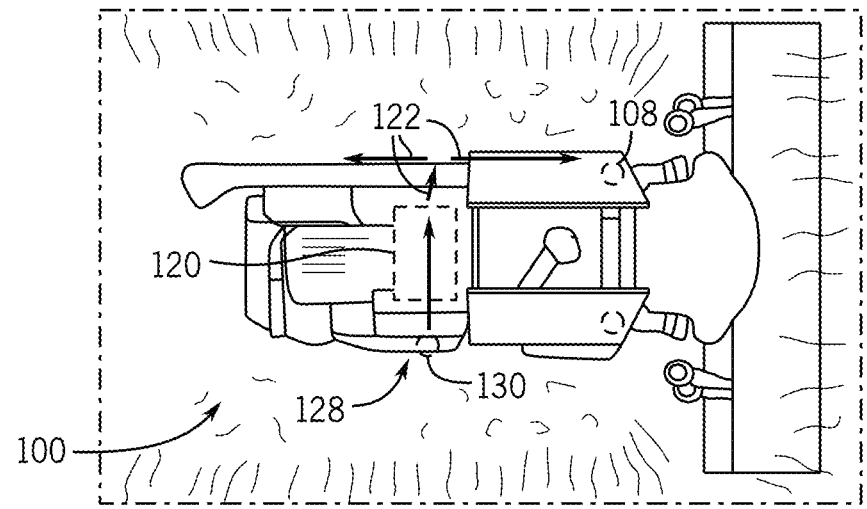
FIG. 3A provides a first illustration of an air flow in a mobile agricultural machine.
Figure 3B:
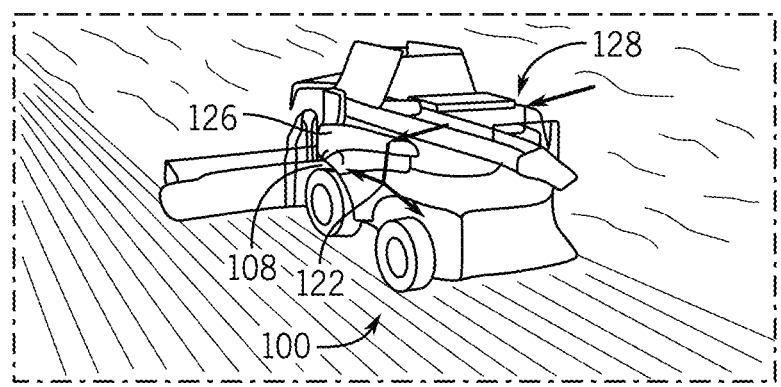
FIG. 3B provides a second illustration of the air flow in the mobile agricultural machine.
Figure 3C:
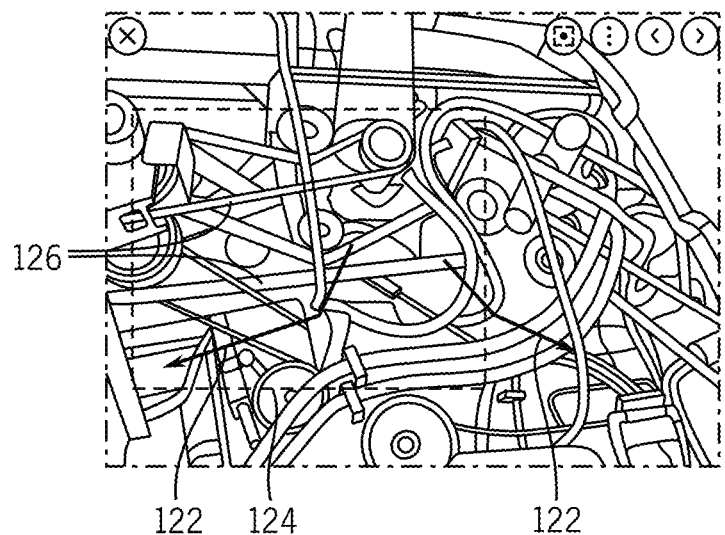
FIG. 3C provides a third illustration of the air flow in the mobile agricultural machine.

Returning to FIG. 2, and with reference to FIGS. 3A to 3C illustrating an air flow (indicated by arrows 122) through the mobile agricultural machine 100, the sensor 108 may be positioned based on one or more air flows 122 present within the mobile agricultural machine 100. For example, a cooling fan of an engine 120 of the machine 100 may influence or dictate air flows within the machine 100. The sensor 108 may be positioned downstream of the air flow 122 passing over one or more components of the machine 100. For example, the sensor 108 may be positioned downstream of an air flow 122 passing over the engine 120, one or more gearboxes (not illustrated but positioned adjacent to engine 120), one or more crop processing components (e.g. chopper 26, rotor 24 etc) and/or one or more belt regions 124 (comprising one or more belts 126) of the machine 100. In this way, the air flow 122 can advantageously carry gaseous compositions relating to any anomalies such as smouldering chaff, belt rubbing, electric cable or electric or electronic component overheating or fluid leakage. The sensor 108 may be positioned adjacent to an inner side of an outer shielding/enclosure panel 126 of the machine 100. In this way, the sensor 108 is exposed to the air flows circulating within the machine and behind the shielding panels 126. In some examples, the controller 110 may identify an anomaly position, or potential anomaly positions, based on a path of the air flow 122 and provide the anomaly position(s) as part of the indication signal.

In the illustrated examples of FIGS. 2 to 3C, the sensor 108 is positioned above a front wheel of the harvester 100 adjacent to an inner side of an outer shielding/enclosure panel 126. The air flow 122 begins at an air intake 128 on a first side of the machine 100. The air intake 128 may be positioned adjacent to the engine 120 and can include a dust shield to protect the engine 120 from the dusty external environment of the crop processing. The air flow 122 passes over the engine 120 (including a cooler and an engine turbo), gear boxes (not shown) and the belt region 124 prior to arriving at the sensor 108. The air flow 122 can gather gaseous compositions corresponding to anomalies with the components that the air flow 122 passes over as well as gaseous compositions corresponding to heated or burning crop, such as smouldering chaff etc.

In some examples, such as illustrated, the machine 100 may comprise a second sensor 130 capable of sensing a gaseous composition. The machine may include an associated second air filtering unit (not shown) to remove particulates in the air flow 122 impinging upon the second sensor 130. The second sensor 130 may be positioned on an inner side of the air intake 128, for example on an inner side of the dust shield. The controller 110 may receive and process a second sensing signal from the second sensor 130 in the same way as described above for the sensor 108. The second sensor 130 may sense gaseous compositions present in the air before the air is blown over the components of the machine 100 (such as the engine, cooler etc) but after the dust separating screen. As a result, the second sensor 130 can advantageously provide a reference reading of gaseous compositions present in the ambient air outside the machine 100 and enable the controller 110 to identify gaseous compositions in a differential mode. In this way, the machine 100 can avoid false alarms due to anomalous gaseous compositions in the local environment, for example from a fire in an adjacent field. The controller 110 may compare the sensing signal from the sensor 108 to the second sensing signal from the second sensor 130 and identify the anomaly based on the comparison. For example, the controller 110 may identify the anomaly based on a difference between the sensing signal and the second sensing signal as the difference will be representative of gaseous components gathered by the air flow 122 when passing over the components of the machine 100.

In some examples, the machine 100 may comprise one or more further sensors (with corresponding further air filtering air units), each further sensor monitoring a corresponding further air flow across one or more corresponding components of the machine 100. The controller 110 may receive and process a further sensing signal from each further sensor in the same way as described above for the sensor 108. Providing multiple sensors enables the machine 100 to independently monitor high-risk areas of the machine 100. The controller 110 may identify an anomaly position, or potential anomaly positions, based on a path of the corresponding further air flow and provide the anomaly position(s) as part of the indication signal. Each further sensor may have a corresponding second further sensor (or share the second sensor 130) to provide a differential measurement in the same way as described above for the sensor 108 and second sensor 130.

In some examples (not illustrated), the machine 100 may comprise a clean air source. The clean air source may be positioned on an inner side of the air intake 128, for example on an inner side of the dust shield. Alternatively, the clean air source may be positioned in the air flow 122 downstream of the cooler and cooler fan but before the engine. The clean air source may provide an intermittent clean air supply into the air flow 122. At the same time, air intake from the surrounding environment may be blocked or inhibited. The clean air source can provide an intermittent reference for the downstream sensor 108 that is free from any gaseous compositions in the environment surrounding the machine 100, such as fire in a neighbouring field. The machine may be configured to alternate between clean air flow from the clean air source and un-clean air flow from the air intake 128. The controller 110 may identify the anomaly based on the sensing signal 112 from the sensor 108 in the presence of the clean air flow. Alternatively, the controller 110 may compare a clean air sensing signal from the sensor 108 in the presence of the intermittent clean air flow with a non-clean air sensing signal from the sensor 108 in the absence of the intermittent clean air flow. The controller 110 may identify the anomaly based on the comparison. For example, the controller 110 may attribute differences in the two sensing signals to influences outside the machine 100. The controller 110 may identify the anomaly based on common components between the two sensing signals.

The air filtering unit 102 removes particulates from the air flow 122 as it flows towards the sensor 108. The air filtering unit 102 can advantageously prevent saturation of a sensing surface of the sensor 108 by filtering dust coming from the operation of the machine (e.g., a harvesting operation), while allowing the passage of gaseous components to be sensed by the sensor 108.

In some examples, the sensor 108 may be positioned in a sealed housing enclosing the sensor 108. The air filtering unit 102 may control the air flow into (and out of) the sealed housing. The second and further sensors may also be enclosed in respective second and further housings of the machine 100.

In some examples, the air filtering unit 102 may comprise a dust filter. In some examples, the dust filter may comprise a porous sheet with a pore diameter sufficiently small to prevent the passage of dust particles while allowing the passage of the gaseous components of the gaseous composition. In other examples, the air filtering unit may comprise an air purifier.

The air filtering unit 102 may be rated to remove particle sizes above a given diameter. For example, the air filtering unit may be rated to remove particulate matter with particle sizes greater than 10 μm (PM10), 2.5 μm (PM2.5) or 0.1 μm (PM0.1). For example, the holes in the porous sheet of a dust filter may have a diameter less than the rating.

In some examples, the controller 110 may detect a saturation or clogging of the dust filter. In response, the controller 110 may output a dust filter alert signal, for example to warn the operator that the dust filter is saturated and the sensor 108 may not be able to detect any anomalies. Alternatively, or in addition, the controller 110 may respond to the saturation of the dust filter by initiating a cleaning mechanism for cleaning the dust filter. For example, the machine 100 may comprise a clean air supply that applies a flow of clean air to the dust filter to remove adhered dust particles. Replacing or cleaning the dust filter can ensure that sufficient air flow 122 reaches the sensor for accurate sensing of the gaseous composition.

In some examples, the air filter unit 102 may comprise an air flow sensor that can sense an air flow at the sensor 108 for ensuring sufficient air flow 122 is reaching the sensor 108. For example, the air flow sensor may sense an air flow through the dust filter or from the dust filter towards the sensor 108. The controller 110 may detect the saturation of the dust filter based on an output signal from the air flow sensor. The air flow sensor may comprise an air flow sensor element that directly monitors air flow. Alternatively, the air flow sensor may comprise a pressure sensor that monitors a change in air pressure as the dust filter becomes saturated. The air flow sensor may be positioned between the dust filter and the sensor 108, for example within the sealed housing. In some examples, the air flow sensor may comprise a differential pressure sensor configured to monitor an air pressure differential across the dust filter. The differential pressure sensor may comprise an internal air pressure sensor positioned on an internal side of the dust filter between the dust filter and the sensor 108 (for example inside the sealed housing) and an external air pressure sensor positioned on an external side of the dust filter (for example outside the sealed housing). A processor of the air flow sensor, or the controller 110, may determine an air flow based on a differential pressure between the internal air pressure sensor and the external air pressure sensor. The controller 110 may detect the saturation of the dust filter based on an output signal from the air flow sensor. For example, the controller 110 may detect a saturation of the dust filter based on any of: an air flow value; a change in air flow value; an air pressure; a change in air pressure; a differential air pressure (between the internal and external air pressure sensors); or a change in differential air pressure falling outside an acceptable range.

The controller 110 may output the indication signal 114 to one or more of: a remote monitoring module; a user device; a cab display unit; an audible signal generator; and a visual signal generator. In some examples, the controller 110 may output the indication signal 114 to a user device, for example a mobile device of the operator such as a mobile phone or a mobile tablet device. In some examples, the controller 110 may output the indication signal 114 to a mobile monitoring module. For example, the mobile monitoring module may comprise a remote computing system located on the farm premises or at a remote monitoring centre. The controller 110 may output the indication signal by any known wired and/or wireless means.

The indication signal 114 may comprise a signal for activating an audible, visible and/or haptic alert, for example an alert in the operator cab 50 and/or on a user device. The controller 110 may output the indication signal 114 to activate a specific alarm based on the anomaly indicated by the gaseous composition. For example, if the gaseous composition is indicative of smouldering or burning chaff, the controller 110 may output the indication signal 114 to an audible fire alarm in the cab 50 to warn the operator to evacuate immediately.

The indication signal 114 may include anomaly data. The anomaly data may include: a type of the anomaly; a position, or potential positions, of the anomaly; a level or severity of the anomaly; and/or operator instructions for inspecting and/or remedying the anomaly. The controller 110 may determine the position or potential positions based on a path of the air flow 122 to the sensor that has provided the sensing signal that is associated with the anomaly. Alternatively, or additionally, the controller 110 may determine the relation between the gaseous composition/anomaly and the position of the anomaly using a look-up table. The controller 114 may output the anomaly data as part of the indication signal 114, for example, for display on a user device or a cab display screen 116 associated with the machine 100. For example, the display screen may display an image representing the (inside of the) machine 100 overlaid with the position or potential positions of the anomaly. The display screen may also display the operator instructions for responding to the anomaly, such as taking a fire extinguisher, removing a shielding panel, replacing oil in a gear box etc. The controller 110 may also output the operator instructions as an audio signal to a speaker of the user device or a speaker in the operator cab 50.

A cab display screen associated with the machine 100, may include a cab display screen 116 located in the operator cab 50 of the machine 100 or, where the machine 100 is an implement towed by an agricultural vehicle, the cab display screen may be located in the agricultural vehicle.

In some examples, the controller 110 may output a control signal for controlling the mobile agricultural machine 100 based on the anomaly indicated by the gaseous composition. In this way, the machine 100 can automatically activate mitigating and/or preventative measures. For example, if smouldering or burning chaff is indicated, the controller 110 may output the control signal to activate a fire extinguishing system. The controller 110 may also output the control signal to: abort an agricultural operation/shut off the engine 120/remove or reduce power to one or more components of the machine 100; and/or increase or decrease a fan speed.

Although the description above relates predominantly to a combine harvester, it will be appreciated that the mobile agricultural machine 100 may comprise any agricultural vehicle and/or agricultural implement. The mobile agricultural machine 100 may comprise any vehicle or implement with moving parts, particularly those capable of generating heat and those with gearboxes or hydraulic systems. The mobile agricultural machine 100 may include a combine harvester, a forage harvester, a tractor or a baler.

Figure 6:
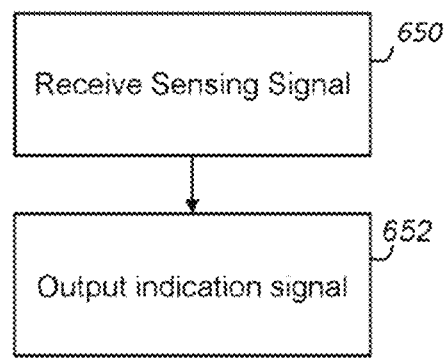
FIG. 6 illustrates a method of monitoring a mobile agricultural machine according to an embodiment of the present disclosure.

FIG. 6 illustrates a method of monitoring an agricultural machine according to an embodiment of the present disclosure. The method may be performed by any processor or controller disclosed herein.

A first step 650 of the method comprises receiving a sensing signal from a sensor of the mobile agricultural machine wherein the sensing signal is representative of a gaseous composition of a filtered air flow impinging on the sensor.

A second step 652 comprises outputting an indication signal if the gaseous composition is indicative of an anomaly associated with an operation of the mobile agricultural machine.

The disclosed machines and methods provide odour sensing technology on the machine that can warn operators anomalies like smouldering chaff, fluid leakages or belts rubbing/slipping, in a timely manner. The disclosed machine and methods provide a sensing system that can trigger alarms on the machine based on the air composition generated from the harvester/machinery operation.

Throughout the present specification, the descriptors relating to relative orientation and position, such as "horizontal", "vertical", "top", "bottom" and "side", are used in the sense of the orientation of the machine as presented in the drawings. However, such descriptors are not intended to be in any way limiting to an intended use of the described or claimed invention.

It will be appreciated that any reference to "close to", "before", "shortly before", "after" "shortly after", "higher than", or "lower than", etc, can refer to the parameter in question being less than or greater than a threshold value, or between two threshold values, depending upon the context.

What is claimed is:

1. A mobile agricultural machine comprising:
   a sensor capable of sensing a gaseous composition of an air flow impinging the sensor;
   an air filtering unit configured to remove particulate matter from the air flow; and
   a controller configured to:
   (i) receive a sensing signal from the sensor, wherein the sensing signal is representative of the gaseous composition generated at least in part by the mobile agricultural machine;
   (ii) compare the sensing signal to a reference odour library;
   (iii) identify an anomaly associated with an operation of the mobile agricultural machine when the sensing signal matches an anomaly reference signal of the reference odour library; and
   (iv) output an indication signal in response to identification of the anomaly.

2. The mobile agricultural machine of claim 1, wherein:
   the sensor comprises a sensor array including a plurality of sensor elements;
   the sensing signal comprises an element response signal for each sensor element; and
   the controller is configured to compare a combination of the element response signals to one or more reference signal combinations of the reference odour library.

3. The mobile agricultural machine of claim 1, wherein the gaseous composition indicative of the anomaly associated with the operation of the mobile agricultural machine comprises one or more of:
   a composition associated with ignition, heating, smouldering, smoking or burning of one or more of: crop, crop residue, a machine fluid, dust or dirt;

a composition associated with friction or rubbing of components;

a composition associated with overheating or burning of electric cables and/or electric or electronic components;

a composition associated with leakage or spillage of a machine fluid; and a composition associated with a drive system malfunction.

4. The mobile agricultural machine of claim 1, wherein the sensor is positioned at a downstream end of an air flow circulating within the mobile agricultural machine.

5. The mobile agricultural machine of claim 1, further comprising a clean air source positioned at an air intake of the agricultural machine wherein:

the clean air source is configured to provide intermittent clean air flow;

the sensor is positioned downstream of an air flow flowing from the air intake; and the controller is configured to:

identify the anomaly based on the sensing signal from the sensor in the presence of the clean air flow from the clean air source.

6. The mobile agricultural machine of claim 1, wherein the mobile agricultural machine further comprises a sealed housing enclosing the sensor and the air filtering unit is configured to control an air flow into the sealed housing.

7. The mobile agricultural machine of claim 1, wherein:

the air filtering unit comprises a dust filter; and the controller is configured to:

(i) detect a saturation of the dust filter; and (ii) in response, output a dust filter alert signal and/or initiate a cleaning mechanism for cleaning the dust filter.

8. The mobile agricultural machine of claim 7, wherein the mobile agricultural machine comprises an air flow sensor configured to sense an air flow or an air pressure at the sensor and wherein the controller is configured to detect a saturation of the dust filter based on the sensed air flow or air pressure.

9. The mobile agricultural machine of claim 8, wherein:

the air flow sensor comprises an air flow sensor element or an air pressure sensor, and the air flow sensor is positioned between the dust filter and the sensor; or the air flow sensor comprises a differential pressure sensor having:

(i) an internal air pressure sensor positioned on an internal side of the dust filter between the dust filter and the sensor; and (ii) an external air pressure sensor positioned on an external side of the dust filter opposite the internal side.

10. The mobile agricultural machine of claim 1, wherein the controller is configured to output the indication signal if a level of the gaseous composition indicative of the anomaly is greater than an anomaly threshold level.

11. The mobile agricultural machine of claim 1, wherein the controller is configured to output the indication signal to one or more of:

a remote monitoring module;

a user device;

a cab display screen;

an audible signal generator; and a visual signal generator.

12. The mobile agricultural machine of claim 1, wherein the controller is configured to output a control signal for controlling the mobile agricultural machine based on the anomaly indicated by the gaseous composition.

13. The mobile agricultural machine of claim 1, wherein the controller is configured to output a control signal to:

activate a fire extinguishing system;

abort an agricultural operation;

remove or reduce power to one or more components of the mobile agricultural machine; and/or increase or decrease a fan speed of a cooling fan.

14. The mobile agricultural machine of claim 1, wherein the gaseous composition indicative of the anomaly associated with the operation of the mobile agricultural machine comprises:

a composition associated with ignition, heating, smouldering, smoking or burning of one or more of: crop, crop residue, a machine fluid, dust or dirt;

a composition associated with friction or rubbing of components;

a composition associated with overheating or burning of electric cables and/or electric or electronic components;

a composition associated with leakage or spillage of a machine fluid; and a composition associated with a drive system malfunction.

15. A method of monitoring a mobile agricultural machine, said method comprising:

receiving a sensing signal from a sensor of the mobile agricultural machine, wherein the sensing signal is representative of a gaseous composition impinging on the sensor, wherein the gaseous composition is generated at least in part by the mobile agricultural machine;

comparing the sensing signal to a reference odour library:

identifying an anomaly associated with an operation of the mobile agricultural machine when the sensing signal matches an anomaly reference signal of the reference odour library; and outputting an indication signal in response to identification of the anomaly.

* * * * *